(12) United States Patent
Allinson et al.

(10) Patent No.: US 8,904,462 B2
(45) Date of Patent: Dec. 2, 2014

(54) SYSTEM AND METHOD FOR COMMUNICATION RESOURCE INFORMATION

(75) Inventors: Stephen A. Allinson, Fairless Hills, PA (US); Navneeth N. Kannan, Doylestown, PA (US); Jeffrey D. Ollis, Dresher, PA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/356,674

(22) Filed: Jan. 24, 2012

(65) Prior Publication Data

US 2013/0191874 A1    Jul. 25, 2013

(51) Int. Cl.
*H04N 7/173* (2011.01)
*H04N 21/462* (2011.01)
*H04L 29/08* (2006.01)

(52) U.S. Cl.
CPC ...... *H04N 21/4622* (2013.01); *H04L 29/08099* (2013.01); *H04N 7/17318* (2013.01)
USPC .............................. 725/109; 725/58; 725/131

(58) Field of Classification Search
CPC ............ H04N 21/435; H04N 21/4622; H04N 21/4782; H04N 21/8586; H04N 21/4788; H04N 7/17318; H04L 29/08099
USPC ......................................................... 725/109
See application file for complete search history.

(56) References Cited

U.S. PATENT DOCUMENTS

| 6,038,625 | A  | * | 3/2000  | Ogino et al. ................... 710/104 |
| 7,003,791 | B2 | * | 2/2006  | Mizutani ........................ 725/21 |
| 7,028,329 | B1 | * | 4/2006  | Mizutani ....................... 725/109 |
| 7,487,534 | B1 | * | 2/2009  | Peterka et al. ................ 725/131 |
| 7,590,703 | B2 | * | 9/2009  | Cashman et al. ............. 709/208 |
| 7,689,995 | B1 | * | 3/2010  | Francis et al. ................ 718/104 |
| 7,818,776 | B1 | * | 10/2010 | Harvey et al. ................. 725/135 |
| 7,848,259 | B2 | * | 12/2010 | Gray et al. .................... 370/255 |
| 7,945,647 | B2 | * | 5/2011  | Tripathi ....................... 709/220 |
| 8,010,643 | B2 | * | 8/2011  | Gray et al. .................... 709/223 |

(Continued)

FOREIGN PATENT DOCUMENTS

WO    2006017218 A2    2/2006

OTHER PUBLICATIONS

Morris, Steven, An Introduction to OCAP, TV Without Borders, Download Date: Jul. 29, 2011. <http://www.interactivetvweb.org/tutorials/ocap>.

Morris, Steven et al., Interactive TV Standards, ELSEVIER: Focal Press, 2005.

(Continued)

*Primary Examiner* — Nasser Goodarzi
*Assistant Examiner* — Michael B Pierorazio
(74) *Attorney, Agent, or Firm* — Lerner, David, Littenberg, Krumholz & Mentlik, LLP

(57) ABSTRACT

A system for communicating resource information may include a resource reservation proxy module to receive a first signal including resource request information. The resource reservation proxy module may be associated with a first environment associated with a requesting application. The resource reservation proxy module may process the received resource request information into a resource request packet, and communicate the resource request packet utilizing an environmentally independent communication protocol. A resource reservation handler module may receive the communicated resource request packet. The resource reservation handler module may be associated with a second environment associated with a resource management application. The resource reservation handler module may process the received resource request packet into a second signal including the resource request information.

20 Claims, 3 Drawing Sheets

(56) References Cited

U.S. PATENT DOCUMENTS

| | | |
|---|---|---|
| 8,078,669 B2 | 12/2011 | Ladd et al. |
| 8,166,513 B2* | 4/2012 | Lejeune ............... 725/131 |
| 2002/0108122 A1 | 8/2002 | Alao et al. |
| 2003/0005453 A1* | 1/2003 | Rodriguez et al. ........... 725/87 |
| 2003/0084453 A1* | 5/2003 | Laughlin et al. ............ 725/60 |
| 2004/0003400 A1 | 1/2004 | Carney et al. |
| 2004/0034877 A1* | 2/2004 | Nogues ............... 725/151 |
| 2004/0187152 A1* | 9/2004 | Francis et al. ............... 725/58 |
| 2004/0194145 A1* | 9/2004 | Douillet et al. ........... 725/110 |
| 2004/0225656 A1 | 11/2004 | Sarkar |
| 2005/0283782 A1 | 12/2005 | Lu et al. |
| 2007/0061724 A1 | 3/2007 | Slothouber et al. |
| 2007/0288975 A1* | 12/2007 | Cashman et al. ............. 725/110 |
| 2009/0064262 A1* | 3/2009 | Lejeune ............... 725/131 |
| 2010/0275068 A1 | 10/2010 | Gu et al. |
| 2011/0093900 A1 | 4/2011 | Patel et al. |
| 2012/0198362 A1* | 8/2012 | Urban et al. ............... 715/762 |

OTHER PUBLICATIONS

Morris, Steven, Managing Resources in an OCAP Environment, TV Without Boarders, Download Date: Jul. 29, 2011. <http://www.interactivetvweb.org/tutorials/ocap/resource_management>.

Morris, Steven, OCAP Applications in Detail, TV Without Boarders, Download Date: Jul. 29, 2011. <http://www.interactivetvweb.org/tutorials/ocap/apps_in_detail1 of>.

OpenCable Application Platform Specifications: OCAP 1.0 Profile, OC-SP-OCAP1.0.2-080314, Cable Television Laboratories, Inc., pp. i-xiv, 1-663, Mar. 14, 2008.

OpenCable Application Platform Specifications: OCAP 1.0 Profile, OC-SP-OCAP1.0-I16-050803, Cable Television Laboratories, Inc., pp. i-xxxiv, 1-592, Aug. 3, 2005.

Morris, Steven, The OCAP Software Architecture, TV Without Boarders, Download Date: Jul. 29, 2011. <http://www.interactivetvweb.org/tutorials/ocap/software.architecture>.

International Search Report for Application No. PCT/US2013/020605 dated May 17, 2013.

* cited by examiner

SYSTEM AND METHOD FOR COMMUNICATION RESOURCE INFORMATION

FIELD OF INVENTION

The invention relates generally to communication of resource information, and more particularly, to a system and method for allowing applications operating in different environments to operate, for example, in a set-top box (STB), using an environmentally independent communication protocol.

BACKGROUND

A STB is a computerized device that processes digital information. A STB is commonly used to receive encoded/compressed digital signals from a signal source (e.g., cable provider's headend) and decodes/decompresses those signals, converting them into signals that a television (TV) connected to the STB can understand and display.

The STB may include a set top environment including an application under the control of a Multiple System Operator (MSO) that centralizes resource management. Applications may include, for example, interactive program guides, applications for displaying sports scores, home shopping etc. The MSO master application may handle resource conflicts and dictate to an underlying platform software how resource conflicts are to be resolved. If other applications desiring resource usage operate in the same application environment (e.g., Open Cable Application Platform (OCAP)) as the MSO master application, the application environment can include a mechanism whereby the underlying implementation can notify the MSO master application when resource contention occurs and allow the MSO master application to decide how the resource conflict should be resolved. However, if the MSO master application and the applications desiring resource usage operate in different application environments, resource contention cannot be resolved in either application environment directly. For example, the MSO master application may be developed in the 'C' programming language, using proprietary interfaces to the platform software. The applications desiring to use platform resources may be Java Xlets bound to services tuned by the platform, operating, for example, in the OCAP application environment. Thus, since the MSO master application and the applications desiring resource usage operate in different application environments, resource contention cannot be resolved in either application environment directly.

The STB platform may include applications written to control the platform and to interact with a user and the application environment. As discussed above, applications may include, for example, interactive program guides, applications for displaying sports scores, home shopping etc. Due to the variety of available STBs, an application written for a STB of a first vendor may not operate on a STB of another vendor without having to re-create the application. It is therefore desirable to provide a STB platform that allows for dissimilar application environments to work together without having to re-create applications for each unique application environment of a STB.

BRIEF DESCRIPTION OF THE DRAWINGS

Features of the present disclosure will become apparent to those skilled in the art from the following description with reference to the figures, in which.

SUMMARY

Figure 1:
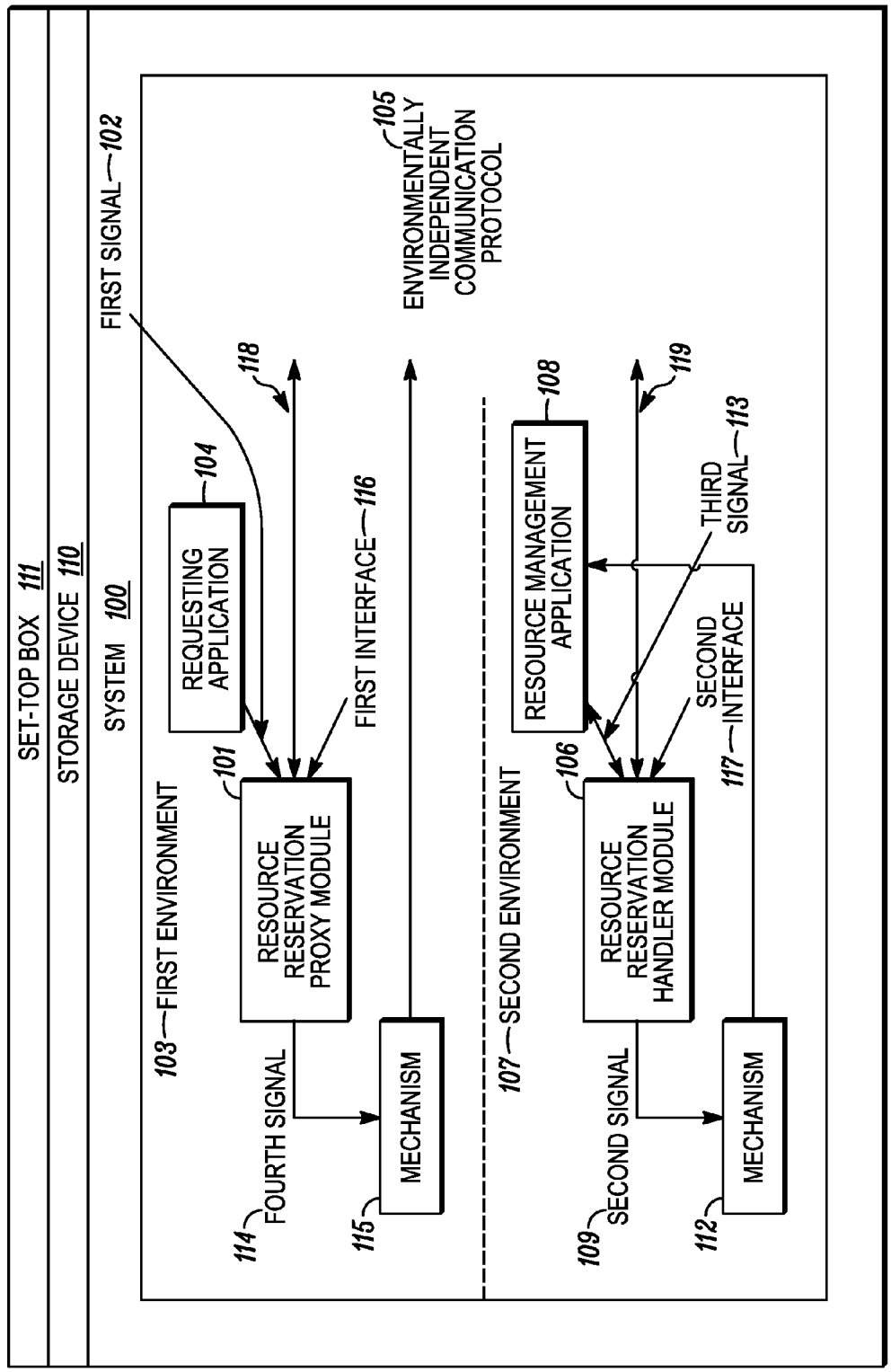
FIG. 1 is a simplified block diagram of a system for communicating resource information, according to an embodiment.

According to an embodiment, a system for communicating resource information may include a resource reservation proxy module, executed by a processor, to receive a first signal including resource request information, wherein the resource reservation proxy module is associated with a first environment associated with a requesting application, to process the received resource request information into a resource request packet, and to communicate the resource request packet utilizing an environmentally independent communication protocol. The system may include a resource reservation handler module to receive the communicated resource request packet, wherein the resource reservation handler module is associated with a second environment associated with a resource management application, and to process the received resource request packet into a second signal including the resource request information.

According to another embodiment, a method for communicating resource information may include receiving a first signal including resource request information at a first interface, wherein the first interface is associated with a first environment associated with a requesting application; processing, by a processor, the received resource request information into a resource request packet; communicating the resource request packet utilizing an environmentally independent communication protocol; receiving the communicated resource request packet at a second interface, wherein the second interface is associated with a second environment associated with a resource management application; and processing the received resource request packet into a second signal including the resource request information.

The methods and other functions described herein may be embodied in machine readable instructions that are executable by a processor and which may be provided in a non-transitory computer readable medium.

DETAILED DESCRIPTION

For simplicity and illustrative purposes, the present disclosure is described by referring mainly to examples thereof. In the following description, numerous specific details are set forth in order to provide a thorough understanding of the present disclosure. It is readily apparent however, that the present disclosure may be practiced without limitation to these specific details. In other instances, some methods and structures have not been described in detail so as not to unnecessarily obscure the present disclosure. Furthermore, different examples are described below. The examples may be used or performed together in different combinations. As used herein, the term "includes" means includes but not limited to the term "including". The term "based on" means based at least in part on.

The system and method for communicating resource information may include a resource reservation proxy (RRP) module associated with each dissimilar application environment of a STB. When an application attempts an operation in one application environment, the RRP for that application environment may communicate with a resource reservation handler (RRH) module associated with the application environment in which a Multiple System Operator (MSO) application resides. The RRH may communicate with the MSO application utilizing the mechanism defined in that application environment for resource management. An environmentally independent communication protocol between the RRP and the RRH may allow for communication among multiple programming languages, multiple address spaces, multiple CPUs, and even multiple devices. In order to accomplish this, the environmentally independent communication protocol may be an Internet protocol, such as, for example, a Simple Object Access Protocol (SOAP). A MSO may thus deploy a MSO application in the application environment in which it currently resides with confidence that new application environments (e.g., OCAP) may be used on a product, such as a STB, while preserving resource management under the control of the MSO application.

As described in detail below, the system for communicating resource information may include the RRP module to receive a first signal including resource request information. The RRP module may be associated with a first environment associated with a requesting application. The RRP module may process the received resource request information into a resource request packet, and communicate the resource request packet utilizing an environmentally independent communication protocol. The RRH module may receive the communicated resource request packet. The RRH module may be associated with a second environment associated with a resource management application. The RRH module may process the received resource request packet into a second signal including the resource request information.

For the system described above, the RRP and RRH modules may be stored in a storage device of an apparatus for receiving digital content. The system may be stored in a storage device of a STB. The RRH module may communicate the second signal to the resource management application utilizing a mechanism associated with the second environment. The RRH module may receive a third signal originating from the resource management application. The third signal may include resource availability information responsive to the resource request information. The RRH module may process the received resource availability information into a resource availability packet, and communicate the resource availability packet utilizing the environmentally independent communication protocol. The RRP module may receive the communicated resource availability packet originating from the RRH module, process the received resource availability packet to form a fourth signal including the resource availability information, and communicate the fourth signal utilizing a mechanism associated with the first environment.

For the system described above, the environmentally independent communication protocol may be an Internet protocol. The Internet protocol may be a simple object access protocol (SOAP) or a hypertext transfer protocol (HTTP). The RRP and/or RRH modules may be an application programming interface. The first environment and the second environment may be separately associated with different respective programming languages, address spaces, central processing units and/or devices. The first environment and the second environment may be separately associated with different respective programming languages.

As described in detail below, a method for communicating resource information may include receiving a first signal including resource request information at a first interface. The first interface may be associated with a first environment associated with a requesting application. The method may include processing the received resource request information into a resource request packet, and communicating the resource request packet utilizing an environmentally independent communication protocol. The method may further include receiving the communicated resource request packet at a second interface. The second interface may be associated with a second environment associated with a resource management application. The method may include processing the received resource request packet into a second signal including the resource request information.

For the method described above, the method may further include communicating the second signal to the resource management application utilizing a mechanism associated with the second environment. The method may include receiving a third signal originating from the resource management application at the second interface. The third signal may include resource availability information responsive to the resource request information. The method may include processing the received resource availability information into a resource availability packet, and communicating the resource availability packet utilizing the environmentally independent communication protocol. The method may include receiving the communicated resource availability packet at the first interface, processing the received resource availability packet to form a fourth signal including the resource availability information, and communicating the fourth signal utilizing a mechanism associated with the first environment. For the method described above, the environmentally independent communication protocol may be an Internet protocol. The first environment and the second environment may be separately associated with different respective programming languages.

As described in detail below, a non-transitory computer readable medium storing computer readable instructions that when executed by a computer system may perform a method for communicating resource information. The method may include receiving a first signal including resource request information at a first interface. The first interface may be associated with a first environment associated with a requesting application. The method may include processing the received resource request information into a resource request packet, and communicating the resource request packet utilizing an environmentally independent communication protocol. The method may further include receiving the communicated resource request packet at a second interface. The second interface may be associated with a second environment associated with a resource management application. The method may include processing the received resource request packet into a second signal including the resource request information.

As described herein with reference to FIG. 1, a system 100 for communicating resource information may include a resource reservation proxy (RRP) module 101 to receive a first signal 102 including resource request information. Resource request information may include, for example, a request to change the size of video (e.g., reduce video size to $\frac{4}{5}^{th}$ of the screen size), or for graphic overlays. The RRP module 101 may be associated with a first environment 103 associated with a requesting application 104. The RRP module 101 may process the received resource request information into a resource request packet, and communicate the resource request packet at 118 utilizing an environmentally independent communication protocol 105. A resource reservation handler (RRH) module 106 may receive the communicated resource request packet via a communication at 119. The RRH module 106 may be associated with a second environment 107 associated with a resource management application 108. The RRH module 106 may process the received resource request packet into a second signal 109 including the resource request information. The RRP and RRH modules 101, 106 may be stored in a storage device 110 of an apparatus for receiving digital content. For example, the system 100 may be stored in a storage device of a STB 111. Alternatively, the system 100 may operate on other devices, such as, for example, a personal computer or a mobile device.

The RRH module 106 may communicate the second signal 109 to the resource management application 108 utilizing a mechanism 112 associated with the second environment 107. The mechanism 112 may modify, if needed, the second signal 109 in a format compatible with the resource management application 108, or otherwise transfer the second signal 109 to the resource management application 108 without modification. The mechanism 112 may be a feature of the RRH module 106. The RRH module 106 may receive a third signal 113 originating from the resource management application 108. The third signal 113 may include resource availability information responsive to the resource request information. The RRH module 106 may process the received resource availability information, that may be included in the resource request packet, into a resource availability packet, and communicate the resource availability packet at 119 utilizing the environmentally independent communication protocol 105. The RRP module 101 may receive the communicated resource availability packet originating from the RRH module 106 via the communication at 118, process the received resource availability packet to form a fourth signal 114 including the resource availability information, and communicate the fourth signal 114 utilizing a mechanism 115 associated with the first environment 103 to the environmentally independent communication protocol 105. The mechanism 115 may modify, if needed, the fourth signal 114 in a format compatible with the environmentally independent communication protocol 105, or otherwise transfer the fourth signal 114 to the environmentally independent communication protocol 105 without modification. The mechanism 115 may be a feature of the RRP module 101.

For the system described above, the environmentally independent communication protocol 105 may be an Internet protocol. For example, the Internet protocol may be SOAP or HTTP. The RRP and/or RRH modules 101, 106 may be an application programming interface. The first and the second environments 103, 107 may be separately associated with different respective programming languages, address spaces, central processing units and/or devices. The first and the second environments 103, 107 may be separately associated with different respective programming languages.

As described above, the system 100 described herein provides for deployment of an application in the second environment 107 associated with the resource management application 108 with confidence that new applications in new application environments (e.g., the first environment 103) may be used while preserving resource management under the control of the resource management application 108.

For example, when moving from the first environment 103 (e.g., OCAP) to the second environment 107 (e.g., including a proprietary platform), applications for the second environment 107 may not be applicable and/or operational in the first environment 103. If the first environment 103 includes an application written in Java and the second environment includes applications written in C or C++, although some of the functionality may be brought from the second to the first environment, the code however may be largely specific to an application environment. The system 100 described herein provides for deployment of an application in the second environment 107 associated with the resource management application 108 with confidence that new applications in new application environments (e.g., the first environment 103) may be used while preserving resource management under the control of the resource management application 108.

If the first environment 103 is the OCAP environment including applications written in Java, the system 100 provides for operation of applications in the OCAP environment with a STB including an application in the second environment 107 associated with the resource management application 108. The OCAP environment may include multiple applications operating at the same time. Examples of applications may include interactive program guides, applications for displaying sports scores, home shopping etc.

The system 100 may provide for the STB 111 running an interactive program guide in the second environment 107 to simultaneously operate a new platform, such as the OCAP platform, in the first environment 103. The system 100 also provides for the first and second environments 103, 107 to control resources of the STB 111. Resources may include, for example, resources related to graphics, video, network interfaces, tuners, scheduling of recordings etc.

Based on the foregoing, the system 100 provides for dissimilar application environments (e.g., the first and second environments 103, 107) to work together so that one of the environments (i.e., second environment 107) maintains control of all the resources and has proxy to the other environment (i.e., first environment 103) so that both environments effectively have control of all of the system resources.

Figure 2:
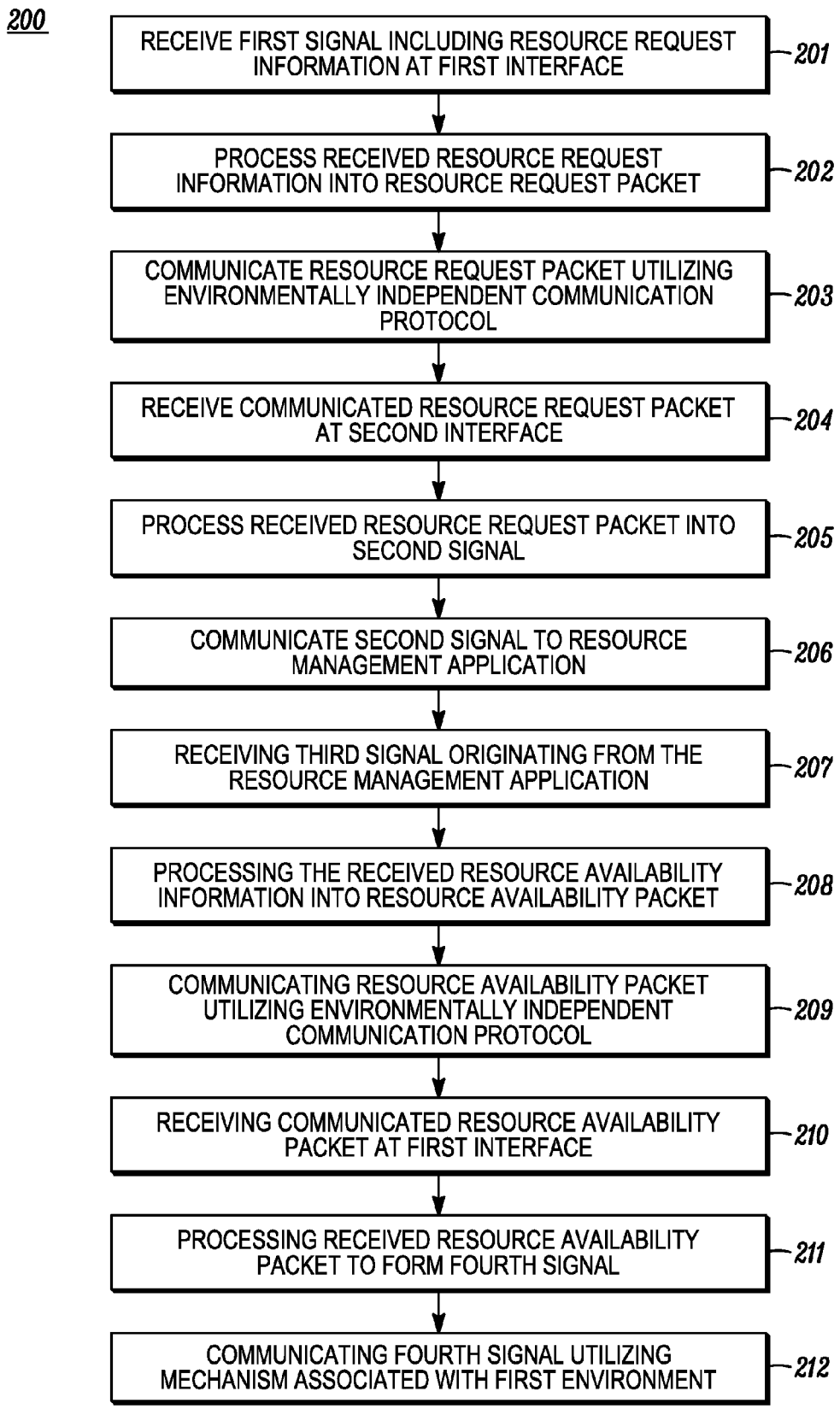
FIG. 2 is a method for communicating resource information, according to an embodiment.

FIG. 2 illustrates a method 200 for communicating resource information, according to an embodiment. The method 200 may be implemented on the system 100 for communicating resource information as described above with reference to FIG. 1 by way of example and not limitation. The method 200 may be practiced in other systems.

For the method 200, referring to FIGS. 1 and 2, at block 201, the method may include receiving the first signal 102 including resource request information at a first interface 116. The first interface 116 may be associated with the first environment 103 associated with the requesting application 104. As shown in FIG. 1, the RRP module 101 may receive the first signal 102 including resource request information. Resource request information may include, for example, a request to change the size of video (e.g., reduce video size to $\frac{4}{5}^{th}$ of the screen size), or for graphic overlays.

At block 202, the method may include processing the received resource request information into a resource request packet. As shown in FIG. 1, the RRP module 101 may process the received resource request information into the resource request packet.

At block 203, the method may include communicating the resource request packet utilizing the environmentally independent communication protocol 105. As shown in FIG. 1, the RRP module 101 may communicate the resource request packet at 118 utilizing the environmentally independent communication protocol 105. The environmentally independent communication protocol 105 may be an Internet protocol.

At block 204, the method may include receiving the communicated resource request packet at a second interface 117 via the communication at 119. The second interface 117 may be associated with a second environment 107 associated with a resource management application 108. The first environment 103 and the second environment 107 may be separately associated with different respective programming languages. As shown in FIG. 1, the RRH module 106 may receive the communicated resource request packet.

At block 205, the method may include processing the received resource request packet into the second signal 109 including the resource request information. As shown in FIG. 1, the RRH module 106 may process the received resource request packet into the second signal 109 including the resource request information. As discussed above with reference to FIG. 1, the RRP and RRH modules 101, 106 may be stored in the storage device 110 of an apparatus for receiving digital content. For example, for the system 100 of FIG. 1, the system may be stored in a storage device of the STB 111. Alternatively, the system 100 may operate on other devices, such as, for example, a personal computer or a mobile device.

At block 206, the method may include communicating the second signal 109 to the resource management application 108 utilizing the mechanism 112 associated with the second environment 107. For example, referring to FIG. 1, the RRH module 106 may communicate the second signal 109 to the resource management application 108 utilizing the mechanism 112 associated with the second environment 107. The mechanism 112 may modify, if needed, the second signal 109 in a format compatible with the resource management application 108, or otherwise transfer the second signal 109 to the resource management application 108 without modification.

At block 207, the method may include receiving the third signal 113 originating from the resource management application 108 at the second interface 117. The third signal 113 may include resource availability information responsive to the resource request information. As shown in FIG. 1, the RRH module 106 may receive the third signal 113 originating from the resource management application 108.

At block 208, the method may include processing the received resource availability information into a resource availability packet. As shown in FIG. 1, the RRH module 106 may process the received resource availability information into a resource availability packet.

At block 209, the method may include communicating the resource availability packet at 119 utilizing the environmentally independent communication protocol 105. As shown in FIG. 1, the RRH module 106 may communicate the resource availability packet utilizing the environmentally independent communication protocol 105.

At block 210, the method may include receiving the communicated resource availability packet at the first interface 116 via the communication at 118. As shown in FIG. 1, the RRP module 101 may receive the communicated resource availability packet originating from the RRH module 106.

At block 211, the method may include processing the received resource availability packet to form a fourth signal 114 including the resource availability information. As shown in FIG. 1, the RRP module 101 may process the received resource availability packet to form the fourth signal 114 including the resource availability information.

At block 212, the method may include communicating the fourth signal 114 utilizing the mechanism 115 associated with the first environment 103. As shown in FIG. 1, the RRP module 101 may communicate the fourth signal 114 utilizing the mechanism 115 associated with the first environment 103 to the environmentally independent communication protocol 105. The mechanism 115 may modify, if needed, the fourth signal 114 in a format compatible with the environmentally independent communication protocol 105, or otherwise transfer the fourth signal 114 to the environmentally independent communication protocol 105 without modification.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as programs comprised of program instructions in source code, object code, executable code or other formats. Any of the above may be embodied on a computer readable storage medium, which include storage devices.

An example of a computer readable storage media includes a conventional computer system RAM (random access memory), ROM (read only memory), EPROM (erasable, programmable ROM), EEPROM (electrically erasable, programmable ROM), hard drives, and flash memory. Concrete examples of the foregoing include distribution of the programs on a CD ROM or via Internet download. It is therefore to be understood that any electronic device capable of executing the above-described functions may perform those functions enumerated above.

Figure 3:
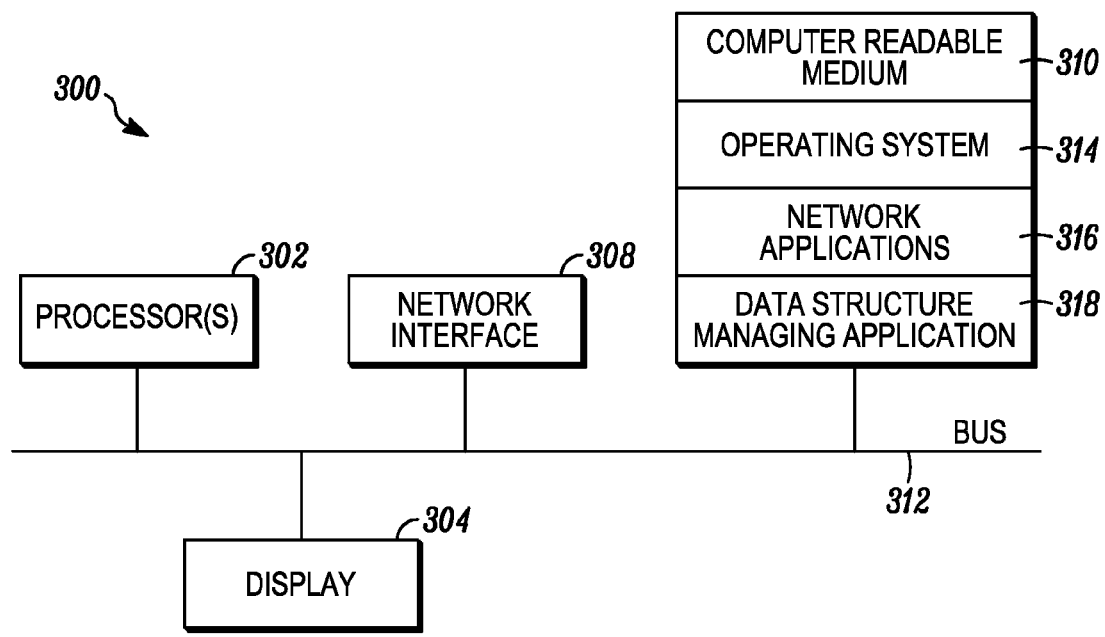
FIG. 3 illustrates a computer system that may be used for the system and related method, according to an embodiment.

Turning now to FIG. 3, there is shown a computing device 300, which may be employed as a platform for implementing or executing the method 200 depicted in FIG. 2, or code associated with the method. It is understood that the illustration of the computing device 300 is a generalized illustration and that the computing device 300 may include additional components and that some of the components described may be removed and/or modified without departing from a scope of the computing device 300.

The device 300 includes a processor 302, such as a central processing unit; a display device 304, such as a monitor; a network interface 308, such as a Local Area Network (LAN), a wireless 802.11x LAN, a 3G or 4G mobile WAN or a WiMax WAN; and a computer-readable medium 310. Each of these components may be operatively coupled to a bus 312. For example, the bus 312 may be an EISA, a PCI, a USB, a FireWire, a NuBus, or a PDS.

The computer readable medium 310 may be any suitable medium that participates in providing instructions to the processor 302 for execution. For example, the computer readable medium 310 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 310 may also store other applications, including word processors, browsers, email, instant messaging, media players, and telephony applications.

The computer-readable medium 310 may also store an operating system 314, such as MAC OS, MS WINDOWS, UNIX, or LINUX; network applications 316; and a data structure managing application 318. The operating system 314 may be multi-user, multiprocessing, multitasking, multithreading, real-time and the like. The operating system 314 may also perform basic tasks such as recognizing input from input devices, such as a keyboard or a keypad; sending output to the display 304 and a design tool; keeping track of files and directories on medium 310; controlling peripheral devices, such as disk drives, printers, image capture device; and managing traffic on the bus 312. The network applications 316 include various components for establishing and maintaining network connections for implementing communication protocols including TCP/IP, HTTP, Ethernet, USB, and FireWire.

The data structure managing application 318 provides various components for building/updating an architecture, such as architecture 300, for a non-volatile memory, as described above. In certain examples, some or all of the processes performed by the application 318 may be integrated into the operating system 314. In certain examples, the processes may be at least partially implemented in digital electronic circuitry, in computer hardware, firmware, machine readable instructions or in any combination thereof.

Although described specifically throughout the entirety of the instant disclosure, representative examples have utility over a wide range of applications, and the above discussion is not intended and should not be construed to be limiting. The terms, descriptions and figures used herein are set forth by way of illustration only and are not meant as limitations. Those skilled in the art recognize that many variations are possible within the spirit and scope of the examples. While the examples have been described, with reference to examples, those skilled in the art are able to make various modifications to the described examples without departing from the scope of the examples as described in the following claims, and their equivalents.

What is claimed is:

1. A system for communicating resource information, the system comprising:
   a resource reservation proxy module, executed by a processor, to
      receive a first signal including resource request information, wherein the resource reservation proxy module is associated with a first environment associated with a requesting application,
      process the received resource request information into a resource request packet, and
      communicate the resource request packet utilizing an environmentally independent communication protocol; and
   a resource reservation handler module to
      receive the communicated resource request packet, wherein the resource reservation handler module is associated with a second environment associated with a resource management application, which is a software application that is separate from the resource reservation handler module,
      process the received resource request packet into a second signal including the resource request information;
      communicate the second signal to the resource management application; and
      receive a third signal originating from the resource management application, wherein the third signal includes resource availability information responsive to the resource request information.

2. The system of claim 1, wherein the resource reservation proxy module and the resource reservation handler module are stored in a storage device of an apparatus for receiving digital content.

3. The system of claim 1, wherein the system is stored in a storage device of a set-top box.

4. The system of claim 1, wherein the resource reservation handler module communicates the second signal to the resource management application utilizing a mechanism associated with the second environment.

5. The system of claim 1, wherein the resource reservation handler module
   processes the received resource availability information into a resource availability packet, and
   communicates the resource availability packet utilizing the environmentally independent communication protocol.

6. The system of claim 5, wherein the resource reservation proxy module
   receives the communicated resource availability packet originating from the resource reservation handler module,
   processes the received resource availability packet to form a fourth signal including the resource availability information, and
   communicates the fourth signal utilizing a mechanism associated with the first environment.

7. The system of claim 1, wherein the environmentally independent communication protocol is an Internet protocol.

8. The system of claim 7, wherein the Internet protocol is a simple object access protocol.

9. The system of claim 1, wherein at least one of the resource reservation proxy module and the resource reservation handler module is an application programming interface.

10. The system of claim 1, wherein the first environment and the second environment are separately associated with at least one of different respective programming languages, address spaces, central processing units and devices.

11. The system of claim 1, wherein the first environment and the second environment are separately associated with different respective programming languages.

12. A method for communicating resource information, the method comprising:
   receiving a first signal including resource request information at a first interface, wherein the first interface is associated with a first environment associated with a requesting application;
   processing, by a processor, the received resource request information into a resource request packet;
   communicating the resource request packet utilizing an environmentally independent communication protocol;
   receiving the communicated resource request packet at a second interface, wherein the second interface is associated with a second environment associated with a resource management application, which is a software application that is separate from the second interface;
   processing the received resource request packet into a second signal including the resource request information;
   communicating the second signal to the resource management application; and
   receiving a third signal originating from the resource management application, wherein the third signal includes resource availability information responsive to the resource request information.

13. The method of claim 12, further comprising communicating the second signal to the resource management application utilizing a mechanism associated with the second environment.

14. The method of claim 12, further comprising
   processing the received resource availability information into a resource availability packet; and
   communicating the resource availability packet utilizing the environmentally independent communication protocol.

15. The method of claim 14, further comprising
   receiving the communicated resource availability packet at the first interface;
   processing the received resource availability packet to form a fourth signal including the resource availability information; and
   communicating the fourth signal utilizing a mechanism associated with the first environment.

16. The method of claim 12, wherein the environmentally independent communication protocol is an Internet protocol.

17. The method of claim 12, wherein the first environment and the second environment are separately associated with different respective programming languages.

18. A non-transitory computer readable medium storing computer readable instructions that when executed by a computer system perform a method for communicating resource information, the method comprising:

receiving a first signal including resource request information at a first interface, wherein the first interface is associated with a first environment associated with a requesting application;

processing, by a processor, the received resource request information into a resource request packet;

communicating the resource request packet utilizing an environmentally independent communication protocol;

receiving the communicated resource request packet at a second interface, wherein the second interface is associated with a second environment associated with a resource management application, which is a software application that is separate from the resource reservation handler module;

processing the received resource request packet into a second signal including the resource request information;

communicating the second signal to the resource management application; and receiving a third signal originating from the resource management application, wherein the third signal includes resource availability information responsive to the resource request information.

19. The non-transitory computer readable medium of claim 18, wherein the method further comprises processing the received resource availability information into a resource availability packet; and communicating the resource availability packet utilizing the environmentally independent communication protocol.

20. The non-transitory computer readable medium of claim 19, wherein the method further comprises receiving the communicated resource availability packet at the first interface;

processing the received resource availability packet to form a fourth signal including the resource availability information; and communicating the fourth signal utilizing a mechanism associated with the first environment.

* * * * *